(12) United States Patent
Guo et al.

(10) Patent No.: US 11,820,947 B2
(45) Date of Patent: Nov. 21, 2023

(54) METHOD OF REDUCING OCTANE LOSS IN CATALYTIC CRACKING OF GASOLINE IN S-ZORB PLANT

(71) Applicant: Shanghai Maritime University, Shanghai (CN)

(72) Inventors: Ji Guo, Shanghai (CN); Yujia Lou, Shanghai (CN); Wanyi Wang, Shanghai (CN); Xianhua Wu, Shanghai (CN); Bangping Gu, Shanghai (CN)

( * ) Notice: Subject to any disclaimer, the term of this patent is extended or adjusted under 35 U.S.C. 154(b) by 240 days.

(21) Appl. No.: 17/489,418

(22) Filed: Sep. 29, 2021

(65) Prior Publication Data

US 2022/0235279 A1 Jul. 28, 2022

(51) Int. Cl.
*C10G 11/00* (2006.01)
*G06F 30/27* (2020.01)
*G06F 111/10* (2020.01)

(52) U.S. Cl.
CPC .............. *C10G 11/00* (2013.01); *G06F 30/27* (2020.01); *C10G 2300/104* (2013.01); *C10G 2300/305* (2013.01); *G06F 2111/10* (2020.01)

(58) Field of Classification Search
CPC .............. C10G 11/00; C10G 2300/104; C10G 2300/305; C10G 47/00; C10G 47/36; G06F 30/27; G06F 2111/10; G16C 20/10; G16C 20/70; G06N 3/04; G06N 3/084; G06N 3/126
See application file for complete search history.

(56) References Cited

U.S. PATENT DOCUMENTS

2019/0093028 A1* 3/2019 Gong ..................... C10G 11/18
2021/0115343 A1* 4/2021 Wang ..................... B01J 29/26

OTHER PUBLICATIONS

Philip Doble, Mark Sandercock, Eric Du Pasquier, Peter Petocz, Claude Roux, Michael Dawson. Classification of premium and regular gasoline by gas chromatography/mass spectrometry, principal component analysis and artificial neural networks. Forensic Science International, 2003, 132(1):26-39, Lausanne, Elsevier Sequoia, Ireland.

Babak Foroughi, Javad Rahbar Shahrouzi, Ramin Nemati. Detection of Gasoline Adulteration Using Modified Distillation Curves and Artificial Neural Network. Chemical Engineering & Technology, 2021,44(3):527-534, Wiley-V-C H Verlag GmbbH & Co., Germany.

\* cited by examiner

*Primary Examiner* — Ellen M McAvoy (74) *Attorney, Agent, or Firm* — Lei Jiang; Lei Jiang LLC (57) ABSTRACT

The present invention discloses a method of reducing octane loss in catalytic cracking of gasoline in S-Zorb plant. The method comprises following steps: a. Collecting equipment data and adjusting differences thereamong to construct initial data sample set; b. Collating data sample set; c. Employing local linear embedding to reduce dimension of independent variables, and trimming the independent variables to obtain reserved independent variables; d. Calculating correlation coefficients of the reserved independent variables and removing variables with too high correlation coefficients to obtain main variables; e. Constructing a BP neural network model of the main variables to obtain optimal octane loss prediction model; f. Employing the optimal octane loss prediction model to obtain a predicted optimal operating condition for each main variable. The present invention has advantage of reducing octane loss and improving quality of refined oil.

1 Claim, 2 Drawing Sheets

METHOD OF REDUCING OCTANE LOSS IN CATALYTIC CRACKING OF GASOLINE IN S-ZORB PLANT

CROSS-REFERENCE TO RELATED APPLICATIONS

The subject application claims priority of the Chinese invention application 202110078304.X filed on 2021 Jan. 24 in China. The contents and subject matter thereof are incorporated herein by reference.

FIELD OF INVENTION

The present invention relates to the field of catalytic cracking and relates in particular to a method of reducing octane loss in catalytic cracking of gasoline in S-zorb plant.

BACKGROUND ART

Catalytic cracking technology is one of the main methods of petroleum secondary processing. Through the joint action of heat energy and catalyst, the heavy oil is converted to cracking gas, gasoline and diesel oil, and then the olefins are converted into LPG by-products through adsorption desulfurization in S-zorb unit. S-zorb unit has low antiknock index loss, good octane number retention, low hydrogen consumption, low energy consumption, high yield of light oil and by-products rich in olefins. Therefore, the study of octane number loss in S-zorb unit catalytic cracking technology is conducive to achieve better cleaning and efficiency maximization of finished products, which is also one of the problems with important application value in chemical industry.

In order to reduce the octane loss of FCC gasoline in S-zorb unit, it is necessary to build a data analysis model to express the reaction process. The key point is to determine the variables that have influence on the octane number content of the product in the catalytic cracking process. From the production process of FCC gasoline in S-zorb unit, there are many variables that affect the octane number content of final product, mainly including raw material properties, adsorbent factors and unit operation conditions. The methods for determining the properties of raw materials, adsorbent factors and operating conditions of the plant are described below.

(1) Raw Materials

The determination of raw material properties is mainly based on chemical mechanism. In actual production, by increasing the blending amount of residuum to increase the content of monocyclic aromatics, dealkylation can generate higher octane number olefin aromatics; By adjusting the variety of raw materials, reducing the sodium content and saturated hydrocarbon content of raw materials, increasing the density of raw materials to increase the octane number of products; and by dehydroaromation to generate high octane number components. Liu et al. (Analysis of factors affecting octane number loss of gasoline in S-zorb unit, petrochemical design, 2019) pointed out that in order to maintain liquid level reflux of refined gasoline and form secondary reaction, the increase of olefin reaction saturation depth will also increase octane number loss, so the refined gasoline reflux can be regulated to reduce this loss.

(2) Adsorbent Factors

The determination of adsorbent factors is mainly based on chemical mechanism and operation experience. The main adsorbent active substances of S-zrob unit are nickel and zinc oxide. In the process of adsorbent reaction, the increase of sulfur and carbon retention rate of raw and regenerated adsorbents is beneficial to reduce the octane number loss of the product, and also affects the desulfurization rate; Zou et al. (The influence of Zn2SiO4 in S-zorb adsorbent on the octane number of gasoline and desulfurization capacity of adsorbent, Journal of petroleum processing, 2020) have studied that the loss of octane number can be reduced by increasing the mass fraction of zinc silicate phase in the adsorbent. At the same time, the increase of the outer surface of the adsorbent will also lead to the weakening of the adsorption capacity of the adsorbent for olefins, reducing the ratio of olefin saturation hydrogenation, thus reducing the loss of octane number.

(3) Operating Conditions of the Plant

At present, in the application of S-zorb unit, the temperature, pressure and feed of the unit are usually regulated to achieve the optimal desulfurization rate and octane number retention. Firstly, the reaction temperature is an important aspect of the application of S-zorb device. Olefin hydrogenation saturation is a strong exothermic reaction, and the increase of reaction temperature will inhibit this reaction, so as to improve the octane number retention. Ma et al. (Optimization operation, technology application and research for reducing octane number loss of gasoline in S-zorb unit, 2020) have studied that the octane number retention of product increases first and then decreases with the increase of temperature, and the critical point is about 427° C. Secondly, reaction pressure is also an important aspect of regulation. Olefin hydrogenation saturation is a volume reduction reaction. The increase of reaction pressure will accelerate the reaction and increase the loss of octane number, but at the same time, the sulfur content of refined gasoline will decrease. To adjust the pressure at different points, it is necessary to find a balance between sulfur content and octane number content. In 2019, the set pressure of S-zorb unit system will be adjusted from 2.5 MPa to 2.45 Mpa, and the differential pressure of filter ME101 will rise to 11 kpa. Finally, in the aspect of feed, hydrogen oil ratio and mass space velocity affect the utility of the unit. Zhou et al. (Analysis and measures for the cause of large octane number loss in S-zorb unit, Yunnan chemical industry, 2019) pointed out that the hydrogen oil ratio, that is, the ratio of gasoline feed to circulating hydrogen, is adopted in S-zorb unit with a molar ratio. Under the condition of constant system pressure, the increase of hydrogen oil ratio will increase the rate of olefin hydrogenation saturation reaction, resulting in octane number loss, but at the same time it can also inhibit the adsorption of adsorbent; The increase of mass space velocity, which is the ratio of gasoline feed to gasoline storage, will inhibit the olefin hydrogenation saturation reaction and reduce the octane number loss, but also reduce the desulfurization rate. Therefore, in terms of feed, it needs to be adjusted accurately to achieve the balance of desulfurization and octane number retention.

To sum up, at present, the process modeling of catalytic cracking technology mainly relies on the existing chemical mechanism to select specific variables to build the model. Because the model based on the chemical mechanism has higher requirements for raw materials, amounts of unit operating points, complex reaction mechanism and nonlinear relationship between variables, the mathematical model based on the chemical principle cannot fully consider the process modeling. Because of the influence of operating point data, raw material data and catalyst data on the octane number loss of final product, the large octane number loss of product often occurs in the application of S-zorb catalytic cracking technology. Therefore, it is necessary to further model the catalytic cracking process of S-zorb unit and obtain the method to determine the catalytic cracking process of S-zorb unit, it provides technical support for the popularization and application of catalytic cracking technology in S-zorb unit.

SUMMARY OF THE INVENTION

Employing data analysis to determine the variables of FCC gasoline process is conducive to obtain the ideal FCC process model and accurate optimal operating conditions, so as to accurately control the point of FCC technology, and reduce the octane loss in the process of FCC gasoline on the premise of meeting the desulfurization requirements. In view of this, in order to solve the problem of incomplete consideration of variables in the process modeling of catalytic cracking technology by using chemical principle, which leads to the increase of octane number loss, we take the octane number loss and sulfur content of the final product as dependent variables, take the operating point data, raw material data and catalyst data of S-zorb unit as independent variables, and establish a mathematical function on this basis to achieve the ideal FCC process model. By controlling the independent variable data, the dependent variable is gradually reduced, and the octane number loss in FCC gasoline process is reduced on the premise of meeting the desulfurization requirements, so as to reduce the octane number loss in refined oil, improve the quality of refined oil, and enrich the selection method of FCC technical operation variables.

The method of reducing octane loss in catalytic cracking of gasoline in S-Zorb plant comprising the following steps:

(1) Collecting equipment data and adjusting differences there among to construct initial data sample set;
i. Measuring and collecting a device data in a specified time interval, the device data comprising operation point data denoted with operating point variables $a_{11}$, $a_{12}, \ldots, a_{1m}, a_{21}, a_{22}, \ldots, a_{2m}, \ldots, a_{j1}, a_{j2}, \ldots, a_{jm}$, raw material data denoted with raw material point variables $b_{11}, b_{12}, \ldots, b_{1n}, b_{21}, b_{22}, \ldots, b_{2n}, \ldots, b_{71}, b_{72}, \ldots, b_{7n}$, catalyst data denoted with catalyst variables $c_{11}, c_{12}, \ldots, c_{1n}, c_{21}, c_{22}, \ldots, c_{2n}, \ldots, c_{41}, c_{42}, \ldots, c_{4n}$, and product data denoted with product variables; the product data comprising product octane loss data $x_1, x_2, \ldots, x_n$ and product sulfur content data $y_1, y_2, \ldots, y_n$; m being a sample number of the operating point variables and being positive integer; n being a sample number of the raw material variables, of the catalyst variables, and of the product variables, and being positive integer; j being a number of the operating point variables being positive integers; the operation point data comprising j of following variables: hydrogen oil ratio, pressure difference of reaction filter, pressure of reductor, flow rate of fluidized hydrogen in reductor, pressure of reactor, temperature of reactor, pressure difference of reactor, temperature of fluidized hydrogen in D-105, pressure of fluidized hydrogen in D-105, flow rate of fluidized hydrogen in D-105, pressure of back blowing hydrogen, pressure of stabilizing tower top, inlet temperature of tower top, outlet temperature of tower top, liquid level of tower top, temperature of tower top, liquid level of D-201 tower top reflux tank, temperature of dry gas out of device, temperature of gasoline out of the device, flow rate of gasoline out of the device, pressure of steam into the device, flow rate of steam into the device, flow rate to feed buffer tank, flow rate of fresh hydrogen, light hydrocarbon into the device, dry gas into the device, flow rate of dirty oil out of the device, temperature of fuel gas into the device, pressure of fuel gas into the device, flow rate of fuel gas into the device, flow rate of nitrogen into the device, pressure of nitrogen into the device, temperature of 1.0 MPa steam into the device, flow rate of circulating water into the device, flow rate of circulating water out of the device, flow rate of 0.3 MPa condensate water out of the device, flow rate of deaerated water into device, flow rate of non-purified air into the device, pressure of non-purified air into the device, pressure difference of D-107 reagent transfer line, flow rate of lifting nitrogen, and total flow of catalytic gasoline into the device; where in j>20;

The raw material data comprising sulfur content of raw material, octane number of raw materials, saturated hydrocarbon, olefin, aromatics, bromine number, and density;

The catalyst data comprising spent sorbent coke, spent sorbent sulfur, regenerated sorbent coke, and regenerated sorbent sulfur; the product data comprising sulfur content of product, octane number loss of product;

ii. Adjusting difference of collection frequency of the operation point data, raw material data, catalyst data and product data: for a sample at time k, it includes $a_{1k}, a_{2k}, \ldots, a_{jk}, b_{1k}, b_{2k}, \ldots, b_{7k}, c_{1k}, c_{2k}, \ldots, c_{4k}, x_1, x_2, \ldots, x_k, y_1, y_2, \ldots, y_k$; for $$m = 40n, \quad a_{ik} = \frac{\sum_{k=k-40}^{k} a_{ix}}{40},$$

wherein i ranging from 1 to j, k=0, 40, 80, ..., n; constructing initial data sample set;

(2) Collating data sample set;
i. Marking bad values outside a normal range of the operation point data due to measurement error; for example, the normal range of pressure difference of reaction filter is 10 KPa to 35 KPa; if a measured value is 40 KPa, then it is out of the normal range of pressure difference of reaction filter;
ii. Marking bad values with large error in the operation point data: calculating arithmetic mean $$\overline{a_{ik}} = \frac{(a_{i1} + a_{i2} + \ldots + a_{im})}{m},$$

wherein i ranging from 1 to j, and residual error $v_i = a_{ik} - \overline{a_{ik}}$, wherein k ranging from 1 to m, of each type of data according to the pauta criterion, then calculating standard error $\partial$ by bessel $$\text{formula } \partial = \left(\frac{\sum_{k=1}^{j} v_i^2}{j-1}\right)^{\frac{1}{2}} = \left\{\frac{1}{j-1} \cdot \left[\sum_{k=1}^{j} a_{ik}^2 - \frac{\left(\sum_{k=1}^{j} a_{ik}\right)^2}{j}\right]\right\}^{\frac{1}{2}};$$

if residual error $v_i$ of measured value $a_{ik}$ meets requirement $|v_i| = |a_{ik} - \overline{a_{ik}}| > 3\partial$, considering $a_{ik}$ as the bad value with larger error;

iii. Processing the bad values in step i and step ii in the operation point data; counting average number of the bad values in each measured variable $a_j$, defining the average number as incomplete data judgment point α. $a_j$. means all the data of variable i. if number of the bad values in a variable $a_j$. exceeds α, eliminating the variable $a_j$.; if number of the bad values in a variable $a_j$. being below α, making each bad value $$a_{ik} = \frac{a_{ik-1} + a_{ik+1}}{2};$$

(3) Employing local linear embedding to reduce dimension of independent variables, and trimming the independent variables to obtain reserved independent variables;
i. Employing local linear embedding to reduce dimension of independent variables in data sample set in step b to obtain a weight coefficient matrix; wherein the independent variables comprise the operation point variables, the raw material variables and the catalyst variables;
ii. Ordering the independent variables according to an absolute value of the first column of the weight coefficient matrix from largest to smallest, and reserving the top 10% as reserved independent variables;
(4) Calculating correlation coefficients of the reserved independent variables and removing variables with too high correlation coefficients to obtain main variables;
i. Calculating correlation coefficients $R_{iu}$ between the reserved independent variables in step c; the equation of definition of correlation coefficient is $$R_{iu} = \frac{\sum_{k=1}^{m}(a_{ik} - \overline{a_{ik}})(a_{uk} - \overline{a_{uk}})}{\sqrt{\sum_{k=1}^{m}(a_{ik} - \overline{a_{ik}})^2 \sum_{k=1}^{m}(a_{uk} - \overline{a_{uk}})^2}}$$

wherein i ranging from 1 to j, u ranging from 1 to j;
When absolute value of any $R_{iu}$ greater than 0.8, considering the correlation coefficient is too high, then calculating $\Sigma_{k=1}^{j}|R_{ik}|$ and $\Sigma_{k=1}^{j}|R_{uk}|$, if $\Sigma_{k=1}^{j}|R_{ik}| > \Sigma_{k=1}^{j}|R_{uk}|$, eliminating $a_j$.; finally obtaining main variables;
ii. Adding octane number of raw materials as one of the main variables to obtain:
$main_{11}$, $main_{12}$, ..., $main_{1m}$, $main_{21}$, $main_{22}$, ..., $main_{2m}$, ..., $main_{l1}$, $main_{l2}$, ..., $main_{lm}$, l being a number of the main variables and being a positive integer;
(5) Constructing a BP neural network model of the main variables to obtain optimal octane loss prediction model;
i. Building a BP neural network with the main variables $main_{11}$, $main_{12}$, ..., $main_{1m}$, $main_{21}$, $main_{22}$, ..., $main_{2m}$, ..., $main_{l1}$, $main_{l2}$, ..., $main_{lm}$, in step d as an input layer, with predicted product sulfur content and predicted product octane number loss as an output layer, with a hidden layer and a number of hidden layer neuron as h=[$\sqrt{l+2}+5$];
Taking 85% of the samples as training set randomly and the other 15% as testing set;
For a weight matrix $W_a$ between the input layer and the hidden layer; employing linear weighted sum to obtain $$Netin_{i_1} = \sum_{j=1}^{n} main_j W_{a_{i_1 j}}$$

of an $i_1$th neuron of the hidden layer, wherein $i_1$ ranging from 1 to h; obtaining an output of the $i_1$th neuron $$H_i = f\left(Netin_{i_1} - q_{a_{i_1}}\right)$$

wherein a hidden layer threshold vector $q_a$ by a activation sigmod function $$f(x) = \frac{1}{1 + \exp(-x)};$$

For a weight matrix $W_b$ between the hidden layer and the output layer, employing linear weighted sum to obtain $$Outnetin_{i_1} = \sum_{j=1}^{n} H_j W_{b_{i_2 j}}$$

of the $i_2$th neuron of the output layer, wherein $i_2$ ranging from 1 to h; obtaining an output of the $i_2$th neuron wherein an output layer threshold vector $q_b$ by inverse function:

$$out_{i_1} = f^{-1}\left(Outnetin_{i_2} - q_{b_{i_2}}\right);$$

for real output vectors $z_1$, $z_2$, obtaining a least square error of prediction result as:

$$E_K = \frac{1}{2}\sum_{i_2=1}^{2}\left(out_{i_2} - z_{i_2}\right);$$

ii. Employing genetic algorithm to obtain optimal parameters of the neural network: firstly, constructing each individual by means of real coding to consist of the weight matrix $W_a$ between the input layer and the hidden layer, the threshold vector $q_a$ of the hidden layer, the weight matrix $W_b$ between the hidden layer and the output layer, and the threshold vector $q_b$ of the output layer, with a population size N; initiating the N individuals with random values, and setting a current number of iterations $N_{ir}$=0; then performing selection, crossover and mutation; selecting each individual by employing a roulette algorithm, with probability of each individual e being selected and passed on to a next generation as:

$$p_e = \frac{f_e}{\sum_{e=1}^{N} f_e},$$

with fitness value for $f_e$ being defined as:

$$f_e = \frac{1}{2}\sum_{e=1}^{2}(out_e - z_e);$$

Employing a roulette algorithm for crossover operation, conducting selection operation by means of optionally selecting two individuals to be crossed over, and setting a crossover probability $P_c=0.8$; performing real value mutation, that is, performing bit inversion on a real code of the individual generated subsequent to the crossover operation with a mutation probability $P_m=0.008$, thereby generating a new individual; increasing the current number of iterations by one; continuing iteration of crossover operation, selection operation, and simple mutation;

For example, formula of cross between the $g_1$ individual and the $g_2$ individual at the $j_1$ intersection position is as follows:

$$\begin{cases} id_{g_1 j_1} = id_{g_1 j_1}(1-RAN) + id_{g_2 j_1} RAN \\ id_{g_2 j_1} = id_{g_2 j_1}(1-RAN) + id_{g_1 j_1} RAN \end{cases},$$

where RAN is random number in [0, 1];

Formula of the $j_2$ mutation location of the $g_3$ individual being as follows:

$$id_{g_3 j_2} = \begin{cases} id_{g_3 j_2} + (id_{g_3 j_2} - id_{max}) \times f(N_{it}), & r_1 > 0.5 \\ id_{g_3 j_2} + (id_{min} - id_{g_3 j_2}) \times f(N_{it}), & r_1 \leq 0.5 \end{cases},$$

wherein $id_{max}$ being the upper bound of $id_{g_3 j_2}$, $id_{min}$ being the lower bound of $id_{g_3 j_2}$, $r_1$ being the random number in [0, 1]; $f(N_{it})$ being mutation formula:

$$f(N_{it}) = r_2 \left(1 - \frac{N_{it}}{G_{max}}\right)^2,$$

$r_2$ being the random number in [0, 1], $N_{it}$ being the current iteration number, $G_{max}$ being the maximum number of iterations;

Until one of stop conditions is reached:

First, the fitness of optimal individual $f_e$ stop rising;

Second, the current number of iterations $N_{it}$ reaches the maximum iteration number $G_{max}$;

Obtaining an optimal neural network with the weight matrix $W_a$ between the input layer and the hidden layer, the threshold vector $q_a$ of the hidden layer, the weight matrix $W_b$ between the hidden layer and the output layer, and the threshold vector $q_b$ of the output layer upon termination of the iteration;

iii. Applying the optimal initial weights $W_a$, $W_b$ and thresholds $q_a$, $q_b$ obtained by genetic algorithm to the neural network for prediction;

If $E_K$ is less than 0.1, saving the network model optimized by genetic algorithm, that is an optimal prediction model of octane number loss; if not, proceeding to step i;

(6) Employing the optimal octane loss prediction model to obtain predicted optimal operating conditions;

i. Employing random operation conditions value of the main$_1$., main$_2$., . . . , main$_l$. to simulate adjustment process according to the normal range of the operation point variables, to obtain random samples, under condition of keeping variables other than the main variables unchanged; employing the optimal prediction model to the random samples;

ii. Discarding a series of qualified samples according to the product sulfur content>10 ppm;

iii. Setting the decrease of octane number loss as weight of the qualified samples, to obtain optimal conditions by weighted average of the qualified samples operation conditions value.

Matlab software is used for the local linear embedding dimension reduction, the establishment of BP neural network model optimized by genetic algorithm and data fitting.

The technical conception of the invention is: through the operation variables determined by the method proposed in the invention, the specific optimal operation variable conditions are obtained based on the specific enterprise data, so as to reduce the octane number loss in the process of catalytic cracking gasoline in the S-zorb unit.

The beneficial effects of the invention are as follows:

(1) In different enterprises, S-zorb units may have different optimal reaction conditions due to different local gas pressure or temperature. Therefore, data analysis method can be used to obtain the method to reduce octane number loss in the process of FCC gasoline in S-zorb unit, and the influencing factors of octane number loss in S-zorb unit can be analyzed according to local conditions.

(2) There is a nonlinear relationship between the operating variables of S-zorb device. The invention uses local linear embedding as a nonlinear dimension reduction method, retains the weight relationship between the original variables, and overcomes the influence of subjective factors.

(3) S-zorb unit has high requirements for raw materials, many operation points and complex reaction mechanism. The invention adopts the BP neural network model optimized by genetic algorithm, which is essentially different from the commonly used method of determining the operation variables by using the chemical mechanism and is also a beneficial supplement to the existing method.

EMBODIMENTS

Figure 1:
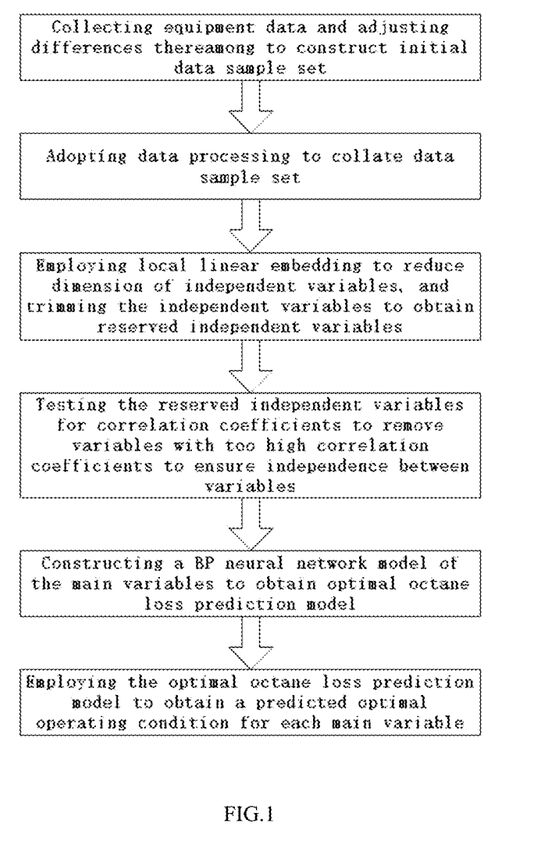
FIG. 1 is a flow chart of the method of reducing octane loss in catalytic cracking of gasoline in S-Zorb plant.

The present invention will be further described with reference to the accompanying drawings:

As shown in FIG. 1, The method of reducing octane loss in catalytic cracking of gasoline in S-Zorb plant comprising the following steps:

(1) Collecting equipment data and adjusting differences thereamong to construct initial data sample set;

i. Measuring and collecting a device data in a specified time interval, the device data comprising operation point data denoted with operating point variables $a_{11}$, $a_{12}$, . . . , $a_{1m}$, $a_{21}$, $a_{22}$, . . . , $a_{2m}$, . . . , $a_{j1}$, $a_{j2}$, . . . , $a_{jm}$, raw material data denoted with raw material point variables $b_{11}$, $b_{12}$, . . . , $b_{1n}$, $b_{21}$, $b_{22}$, . . . , $b_{2n}$, . . . , $b_{71}$, $b_{72}$, . . . , $b_{7n}$, catalyst data denoted with catalyst variables $c_{11}$, $c_{12}$, . . . , $c_{1n}$, $c_{21}$, $c_{22}$, . . . , $c_{2n}$, . . . , $c_{41}$, $c_{42}$, . . . , $c_{4n}$, and product data denoted with product variables; the product data comprising product octane loss data $x_1$, $x_2$, . . . , $x_n$ and product sulfur content data $y_1$, $y_2$, . . . , $y_n$; m being a sample number of the operating point variables and being positive integer; n being a sample number of the raw material variables, of the catalyst variables, and of the product variables, and being positive integer; j being a number of the operating point variables being positive integers;

The operation point data comprising j of following variables: hydrogen oil ratio, pressure difference of reaction filter, pressure of reductor, flow rate of fluidized hydrogen in reductor, pressure of reactor, temperature of reactor, pressure difference of reactor, temperature of fluidized hydrogen in D-105, pressure of fluidized hydrogen in D-105, flow rate of fluidized hydrogen in D-105, pressure of back blowing hydrogen, pressure of stabilizing tower top, inlet temperature of tower top, outlet temperature of tower top, liquid level of tower top, temperature of tower top, liquid level of D-201 tower top reflux tank, temperature of dry gas out of device, temperature of gasoline out of the device, flow rate of gasoline out of the device, pressure of steam into the device, flow rate of steam into the device, flow rate to feed buffer tank, flow rate of fresh hydrogen, light hydrocarbon into the device, dry gas into the device, flow rate of dirty oil out of the device, temperature of fuel gas into the device, pressure of fuel gas into the device, flow rate of fuel gas into the device, flow rate of nitrogen into the device, pressure of nitrogen into the device, temperature of 1.0 MPa steam into the device, flow rate of circulating water into the device, flow rate of circulating water out of the device, flow rate of 0.3 MPa condensate water out of the device, flow rate of deaerated water into device, flow rate of non-purified air into the device, pressure of non-purified air into the device, pressure difference of D-107 reagent transfer line, flow rate of lifting nitrogen, total flow of catalytic gasoline into the device, flow rate of 1# catalytic gasoline into the unit, flow rate of 2# catalytic gasoline into the unit, flow rate of 3# catalytic gasoline into the unit, liquid level of raw material buffer tank, temperature of raw material into the unit, flow rate of raw material into the unit, outlet flow rate of raw material pump, hydrogen flow rate of hydrogen mixing point, inlet temperature of main pipe of raw material heat exchanger, pressure difference of main pipe of raw material heat exchanger, inlet temperature of heating furnace, outlet temperature of heating furnace, oxygen content pressure, furnace pressure, inlet temperature of reactor, outlet temperature of reactor, outlet pressure of radiation chamber, gas inlet pressure of main nozzle of heating furnace, pressure in front of main nozzle valve of heating furnace, outlet pressure of K-101 machine, D-104 pressure, liquid level, flow rate of destabilizer, temperature of destabilizer, D-121 pressure, liquid level, flow rate of top flare, temperature of top flare, reaction system pressure, temperature of reductor, flow rate of regeneration air, flow rate of regeneration cold nitrogen, flow rate of R-102 regenerator lifting nitrogen, flow rate of regeneration cold nitrogen generator pressure, top and bottom differential pressure, top flue gas temperature, lower temperature, receiver differential pressure, storage capacity, oxygen content of regeneration flue gas, D-110 top and bottom differential pressure, R-102 transfer agent line differential pressure, flare gas discharge flow rate, new hydrogen flow rate into the unit, product gasoline flow rate out of the unit, cumulative flow of raw material into the unit, cumulative flow of waste hydrogen discharge, cumulative flow of flare gas discharge, inlet manifold temperature of E-101 shell side, temperature of E-101 tube side inlet main pipe, pressure of E-101 tube side inlet main pipe, temperature of E-101 shell side outlet main pipe, pressure of E-101 shell side outlet main pipe, D-204 liquid level, D-101 raw material buffer tank pressure, D-203 fuel gas inlet pipe temperature, top outlet pipe temperature, outlet fuel gas flow rate, top outlet pipe, bottom liquid level, D-202 liquid level, D-201 water drum boundary, D-125 liquid level, D-125 pressure, D-124 liquid level, D-124 pressure, D-123 steam outlet flow rate, condensate tank liquid level, condensate inlet flow rate, D-122 liquid level, inlet pipe temperature, top outlet pipe temperature, D-121 water level, D-114 liquid level, D-113 top vent line flow rate, D-110 steam coil inlet flow rate, bottom pressure, bottom fluidizing nitrogen flow rate, D-109 pressure, adsorbent level, loose air flow rate, D-107 lower loose air flow rate, D-107 temperature, D-107 top pressure, D-107 bottom pressure, bottom discharge slide valve differential pressure, bottom slide valve, D-106 pressure instrument nozzle back blowing air flow rate, temperature, hot nitrogen flow rate, D-105 lower cone loose air flow rate, upper jumper loose air flow rate, D-103 bottom liquid level, D-102 temperature, D-101 dehydrator liquid level, C-201 lower feed pipe temperature, C-201#37 layer tray temperature, A-202 a/b outlet main pipe temperature, A-201 outlet main pipe temperature, EH-101 outlet, D-110 top pressure, pressure differential in regenerator receiver and LH, pressure differential in regeneration feed tank and LH, preheated air outlet pressure, PDI-2107 point, flue gas radiation chamber temperature, flue gas outlet temperature of convection chamber, pressure of hydrogen mixing point at outlet of recycle hydrogen compressor, flow rate of recycle hydrogen to lock hopper leg, D-113 pressure, flow rate of hot recycle gas to R-101 bottom riser, differential pressure of hot nitrogen filter ME-113, differential pressure of cold nitrogen filter ME-114, pressure of flue gas inlet of preheated air, temperature of flue gas inlet of preheated air, pressure of air outlet, temperature of air outlet, bypass flow rate of feed control valve, emergency hydrogen main, emergency hydrogen flow rate to R-101, emergency hydrogen flow rate to D-102, liquid level of flare drum D-206, inlet pressure of blower, dew point temperature of non-purified air after drying, differential pressure between reactor receiver and LH, differential pressure of make-up hydrogen of back blowing gas collector, low pressure hot nitrogen pressure, flow rate of return pipe at outlet of make-up hydrogen compressor, liquid level of lock hopper, oxygen content, top pressure, hydrocarbon content control, hydrogen charging line pressure control, nitrogen filter outlet gas flow rate, hydrogen filter outlet gas flow rate, R-102 lower pressure, bed adsorbent level density, bottom nozzle pressure difference, nitrogen line pressure behind bottom discharge slide valve, bottom slide valve differential pressure, bottom cone temperature, ventilation baffle 1# temperature, ventilation baffle 3# temperature, R-101 lower bed pressure drop, upper bed pressure drop, top reaction product outlet pipe temperature, the upper and lower bottom grilles pressure differential, temperature in the middle of the bed, pressure in the middle of the bed, temperature in the lower part of the bed, pressure in the outlet main pipe of P-105 a/b, differential pressure in the inlet filter of P-101 b, pressure differential in the inlet filter of P-101 a, t pressure differential in the filters of ME-115, pressure differential in the filters of ME-112, pressure differential in the filters of ME-109, pressure differential in the filters of ME-108, pressure differential in the filters of ME-105, pressure differential in the inlet and outlet of ME-104, pressure differential in the inlet and outlet of ME-103, pressure in the back blowing main pipe of ME-101, pressure in the back blowing main pipe of ME-103, pressure from the outlet of K-103 to K-101 outlet pipe, inlet pressure of K-103 a/b, temperature of K-103 a/b, outlet pressure of K-103 a/b, temperature of K-103 a/b, inlet pressure of K-102 a/b, temperature of K-102 a/b, outlet pressure of K-102 a/b, temperature of K-102 a/b, left exhaust temperature of K-101 a/b, right exhaust temperature of K-101 a/b, left exhaust pressure of K-101 a/b, right exhaust pressure of K-101 a/b, inlet temperature of K-101 a/b, pressure of K-101 a/b, HV2533 manual operator, F-101 long light line pressure, circulating hydrogen outlet pipe temperature, radiation chamber bottom pressure, radiation chamber outlet pressure, outlet main pipe pressure, outlet branch pipe 1# temperature, outlet branch pipe 2# temperature, outlet branch pipe 3# temperature, outlet branch pipe 4# temperature, EH-103 inlet flow rate, heating element temperature, heating element humidity, EH-102 heating element a beam temperature, EH-102 heating element b beam temperature, EH-102 outlet air main pipe temperature, EH-101 heating element temperature, EH-101 heating element humidity, E-203 reboiler tube side outlet condensate flow rate, E-203 shell side outlet pipe temperature, E-205 shell side outlet pipe temperature, E-205 tube side inlet pipe temperature, E-106 tube side inlet pipe temperature, E-106 tube side outlet pipe temperature, E-105 tube side outlet pipe temperature, E-101 shell side inlet main pipe temperature, filter ME-101 outlet temperature, filter ME-101 differential pressure, filter ME-101 back blowing pressure, filter ME-101 preheater outlet air temperature, convection chamber outlet temperature, D-121 sulfur-containing sewage displacement, D-201 sulfur-containing sewage displacement, D-121 sulfur-containing sewage liquid level, D-201 sulfur-containing sewage liquid level, E-101abc tube side outlet temperature, E-101abc shell side outlet temperature, E E-101def tube side outlet temperature, E-101def shell side outlet temperature, E-101 shell side inlet main pipe temperature, E-101 shell side outlet main pipe temperature, reactor linear velocity, storage capacity, mass space velocity, material level, heating furnace efficiency, hydrocracking light naphtha inlet flow rate, hydrocracking light naphtha cumulative flow, gasoline product degassing split flow rate, gasoline product degassing split cumulative flow, 8.0 MPa hydrogen to recycle hydrogen compressor inlet flow rate, 8.0 MPa hydrogen to recycle hydrogen compressor cumulative flow, 8.0 MPa hydrogen flow rate, 8.0 MPa hydrogen cumulative flow; where in j>20;

The raw material data comprising sulfur content of raw material, octane number of raw materials, saturated hydrocarbon, olefin, aromatics, bromine number, and density;

The catalyst data comprising spent sorbent coke, spent sorbent sulfur, regenerated sorbent coke, and regenerated sorbent sulfur; the product data comprising sulfur content of product, octane number loss of product;

ii. Adjusting difference of collection frequency of the operation point data, raw material data, catalyst data and product data: taking the operation point data corresponding to the product data as mean value measuring in previous two hours, corresponding to the product data, the raw material data, and the catalyst data measured at that time, and constructing initial data sample set;

(2) Collating data sample set;
i. Marking bad values outside a normal range of the operation point data due to measurement error; for example, the normal range of pressure difference of reaction filter is 10 KPa to 35 KPa; if a measured value is 40 KPa, then it is out of the normal range of pressure difference of reaction filter;
ii. Marking bad values with large error in the operation point data: calculating arithmetic mean $$\overline{a_{ik}} = \frac{(a_{i1} + a_{i2} + \ldots + a_{im})}{m},$$

wherein i ranging from 1 to j, and residual error $v_i = a_{ik} - \overline{a_{ik}}$, wherein k ranging from 1 to m, of each type of data according to the pauta criterion, then calculating standard error ∂ by bessel $$\text{formula } \partial = \left(\frac{\sum_{i=1}^{j} v_i^2}{j-1}\right)^{\frac{1}{2}} = \left\{\frac{1}{j-1} \cdot \left[\sum_{i=1}^{j} a_{ik}^2 - \frac{\left(\sum_{i=1}^{j} a_{ik}\right)^2}{j}\right]\right\}^{\frac{1}{2}};$$

if residual error $v_i$ of measured value $a_{ik}$ meets requirement $|v_i|=|a_{ik}-\overline{a_{ik}}|>3\partial$, considering $a_{ik}$ as the bad value with larger error;

iii. Processing the bad values in step i and step ii in the operation point data; counting average number of the bad values in each measured variable $a_i$, defining the average number as incomplete data judgment point α, if number of the bad values in a variable $a_i$ exceeds α, eliminating the variable $a_i$; if number of the bad values in a variable $a_i$ being below α, making each bad value $$a_{ik} = \frac{a_{ik-1} + a_{ik+1}}{2};$$

(3) Employing local linear embedding to reduce dimension of independent variables, and trimming the independent variables to obtain reserved independent variables;

i. Employing local linear embedding to reduce dimension of independent variables in data sample set in step b to obtain a weight coefficient matrix; wherein the independent variables comprise the operation point variables, the raw material variables and the catalyst variables; employing the local linear embedding method to reduce the dimension of the independent variables in step b:

Step 1, the locally linear range uses the K-nearest neighbor principle. because of locally linearity, representing each data point $x_i$ by a linear combination of its nearest neighbor data points. that is $x_i = \sum_{j=1}^{k} w_{ji}x_{ji}$, $N_i = knn(x_i, k)$, $N_i = [x_{1i}, \ldots, x_{ki}]$, where $w_i$ is k×1 column vector, $w_{ji}$ is row j of $w_i$, $x_{ji}$ is the j th nearest neighbor to $x_i$, (1≤j≤k), $w_i = [w_{1i}, \ldots, w_{ki}]^T$, $x_i = [x_{1i}, \ldots, x_{Di}]^T$, where D is the dimension of $x_i$;

Step 2, to solve the weight coefficient matrix means to solve the constrained optimization problem as follows: arg min $\sum_{i=1}^{N} \|x_i - \sum_{j=1}^{k} w_{ji}x_{ji}\|^2$, s.t.$\sum_{j=1}^{k} w_{ji}=1$;

Step 3, thus, deducing the expression of the weight coefficient matrix:

$\phi(w) = \sum_{i=1}^{N} \|x_i - \sum_{j=1}^{k} w_{ji}x_{ji}\|^2 = \sum_{i=1}^{N} \|x_i - \sum_{j=1}^{k} w_{ji}(x_i - x_{ji})\|^2 = \sum_{i=1}^{N} \|X_i - \sum_{j=1}^{k} w_i(X_i - N_i)\|^2$, $X_i = [x_i, \ldots, x_i]$, $N_i = [x_{1i}, \ldots, x_{ki}] = \sum_{i=1}^{N} w_i^T(X_i - N)^T(X_i - N)w_i$ Step 4, then viewing $S_i$ as local covariance matrix, $S_i = (X_i - N_i)^T(X_i - N_i)$. viewing it as: $\phi(w) = \sum_{i=1}^{N} w_i^T S_i w_i$, and employing the lagrange multiplier: $L(w_i) = w_i^T S_i w_i + l(w_i^T 1_k - 1)$, where $1_k$ is k×1 column vector with entries of 1; taking derivative of $L(w_i)$:

$$\frac{\partial L(w_i)}{\partial w_i} = 2S_i w_i + l1_k = 0, w_i = \frac{S_i^{-1} 1_k}{1_k^T S_i^{-1} 1_k};$$

Figure 2:
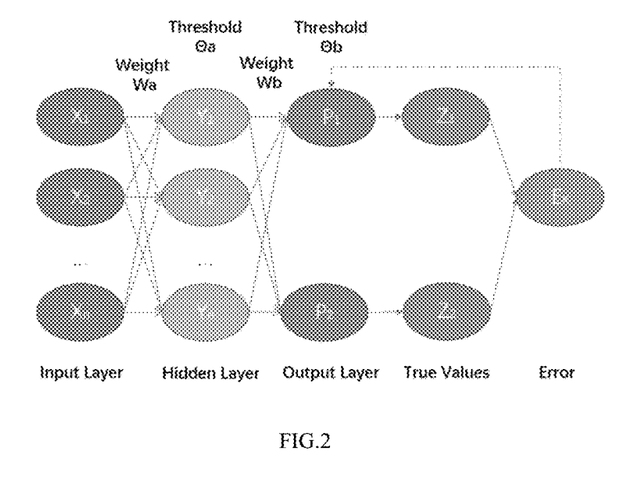
FIG. 2 is diagram of BP network.

Step 5, the low-dimensional representation should have the same locally geometric property, so employing same linear representation expression to finally form the quadratic form; therefore, mapping a low-dimensional space to solve the following constrained optimization problem:

$$\arg\min_{Y} y(Y) = \sum_{i=1}^{N} \left\| y_i - \sum_{j=1}^{k} w_{ji} y_{ji} \right\|^2,$$

$$\text{s.t.} \sum_{i=1}^{k} y_i y_i^T = NI_{d \times d},$$

the output result is the d×N matrix Y=[$y_1, y_2, \ldots, y_N$], and low-dimensional space vectors comprise Y;

Step 6, employing sparse matrix W to represent w: $\sum_{j=1}^{N} w_{ji} y_{ji} = \sum_{j=1}^{k} w_{ji} y_{ji} = YW_i$, $$\begin{cases} W_{ji} = w_{ji}, & j \text{ is the nearest neighbor to } i \\ W_{ji} = 0, & \text{others} \end{cases},$$

where $W_i$ is the i column of W(N×N), $I_i$ is the i column of unit matrix I(N×N), $y_i$ is the i column of Y; so, $y(Y) = \sum_{i=1}^{N} \|Y(1_i - W_i)\|^2 = \text{tr}[Y(I-W)(I-W)^T Y^T]$;

Step 7, making $M=(I-W)(I-W)^T$; employing the lagrange multiplier again: $L(Y) = YMY^T + l(YY^T - NI)$; taking derivative of L(Y):

$$\frac{\partial L}{\partial Y} = 2MY^T + 2lY^T = 0, \quad 2MY^T = l'Y^T;$$

so Y is the matrix composed of the eigenvectors of M; Step 8, to reduce the data to D dimension, taking the minimum d eigenvectors corresponding to non-zero Eigen values of M; generally, the first minimum Eigen value is close to 0, so abandon it;

Step 9, obtaining the weight coefficient matrix by taking the eigenvectors corresponding to the previous [2, d+1] eigen values from the smallest to the largest;
  ii. Ordering the independent variables according to an absolute value of the first column of the weight coefficient matrix from largest to smallest, and reserving the top 10% as reserved independent variables;
  (4) Calculating correlation coefficients of the reserved independent variables and removing variables with too high correlation coefficients to obtain main variables;
  i. Calculating correlation coefficients $R_{iu}$ between the reserved independent variables in step c; the equation of definition of correlation coefficient is $$R_{iu} = \frac{\sum_{k=1}^{m} (a_{ik} - \overline{a_{ik}})(a_{uk} - \overline{a_{uk}})}{\sqrt{\sum_{k=1}^{m} (a_{ik} - \overline{a_{ik}})^2 \sum_{k=1}^{m} (a_{uk} - \overline{a_{uk}})^2}}$$

wherein i ranging from 1 to j, u ranging from 1 to j;

When absolute value of any $R_{iu}$ greater than 0.8, considering the correlation coefficient is too high, then calculating $\sum_{k=1}^{j} |R_{ik}|$ and $\sum_{k=1}^{j} |R_{uk}|$, if $\sum_{k=1}^{j} |R_{ik}| > \sum_{k=1}^{j} |R_{uk}|$, eliminating $a_i$.; finally obtaining main variables;
  ii. Adding octane number of raw materials as one of the main variables to obtain:
$\text{main}_{11}, \text{main}_{12}, \ldots, \text{main}_{1m}, \text{main}_{21}, \text{main}_{22}, \ldots, \text{main}_{2m}, \ldots, \text{main}_{l1}, \text{main}_{l2}, \ldots, \text{main}_{lm}$, l being a number of the main variables and being a positive integer;
  (5) Constructing a BP neural network model of the main variables to obtain optimal octane loss prediction model;
  i. Building a BP neural network with the main variables $\text{main}_{11}, \text{main}_{12}, \ldots, \text{main}_{1m}, \text{main}_{21}, \text{main}_{22}, \ldots, \text{main}_{2m}, \ldots, \text{main}_{l1}, \text{main}_{l2}, \ldots, \text{main}_{lm}$, in step d as an input layer, with predicted product sulfur content and predicted product octane number loss as an output layer, with a hidden layer and a number of hidden layer neuron as h=[$\sqrt{l+2}+5$];

Taking 85% of the samples as training set randomly and the other 15% as testing set;

For a weight matrix $W_a$ between the input layer and the hidden layer; employing linear weighted sum to obtain $$Netin_{i_1} = \sum_{j=1}^{n} main_j W_{a_{i_1 j}}$$

of an $i_1$th neuron of the hidden layer, wherein $i_1$ ranging from 1 to h; obtaining an output of the $i_1$th neuron $$H_i = f\left(Netin_{i_1} - q_{a_{i_1}}\right)$$

wherein a hidden layer threshold vector $q_a$ by a activation sigmod function $$f(x) = \frac{1}{1 + \exp(-x)};$$

For a weight matrix $W_b$ between the hidden layer and the output layer, employing linear weighted sum to obtain $$Outnetin_{i_1} = \sum_{j=1}^{n} H_j W_{b_{i_2 j}}$$

of the $i_2$th neuron of the output layer, wherein $i_2$ ranging from 1 to h; obtaining an output of the $i_2$th neuron wherein an output layer threshold vector $q_b$ by inverse function:

$$out_{i_1} = f^{-1}\left(Outnetin_{i_2} - q_{b_{i_2}}\right);$$

for real output vectors $z_1, z_2$, obtaining a least square error of prediction result as:

$$E_K = \frac{1}{2} \sum_{i_2=1}^{2} \left(out_{i_2} - z_{i_2}\right);$$

ii. Employing genetic algorithm to obtain optimal parameters of the neural network: firstly, constructing each individual by means of real coding to consist of the weight matrix $W_a$ between the input layer and the hidden layer, the threshold vector $q_a$ of the hidden layer, the weight matrix $W_b$ between the hidden layer and the output layer, and the threshold vector $q_b$ of the output layer, with a population size N; initiating the N individuals with random values, and setting a current number of iterations $N_{it}=0$; then performing selection, crossover and mutation; selecting each individual by employing a roulette algorithm, with probability of each individual e being selected and passed on to a next generation as:

$$p_e = \frac{f_e}{\sum_{e=1}^{N} f_e},$$

with fitness value for $f_e$ being defined as:

$$f_e = \frac{1}{2}\sum_{e=1}^{2}(out_e - z_e);$$

Employing a roulette algorithm for crossover operation, conducting selection operation by means of optionally selecting two individuals to be crossed over, and setting a crossover probability $P_c=0.8$; performing real value mutation, that is, performing bit inversion on a real code of the individual generated subsequent to the crossover operation with a mutation probability $P_m=0.008$, thereby generating a new individual; increasing the current number of iterations by one; continuing iteration of crossover operation, selection operation, and simple mutation;

For example, formula of cross between the $g_1$ individual and the $g_2$ individual at the $j_1$ intersection position is as follows:

$$\begin{cases} id_{g_1 j_1} = id_{g_1 j_1}(1 - RAN) + id_{g_2 j_1} RAN \\ id_{g_2 j_1} = id_{g_2 j_1}(1 - RAN) + id_{g_1 j_1} RAN \end{cases}$$

where RAN is random number in [0, 1];

Formula of the $j_2$ mutation location of the $g_3$ individual being as follows:

$$id_{g_3 j_2} = \begin{cases} id_{g_3 j_2} + (id_{g_3 j_2} - id_{max}) \times f(N_{it}), r_1 > 0.5 \\ id_{g_3 j_2} + (id_{min} - id_{g_3 j_2}) \times f(N_{it}), r_1 \leq 0.5 \end{cases},$$

wherein $id_{max}$ being the upper bound of $id_{g_3 j_2}$, $id_{min}$ being the lower bound of $id_{g_3 j_2}$, $r_1$ being the random number in [0, 1]; $f(N_{it})$ being mutation formula:

$$f(N_{it}) = r_2\left(1 - \frac{N_{it}}{G_{max}}\right)^2,$$

$r_2$ being the random number in [0, 1], $N_{it}$ being the current iteration number, $G_{max}$ being the maximum number of iterations;

Until one of stop conditions is reached:
First, the fitness of optimal individual $f_e$ stop rising;
Second, the current number of iterations $N_{it}$ reaches the maximum iteration number $G_{max}$;

Obtaining an optimal neural network with the weight matrix $W_a$ between the input layer and the hidden layer, the threshold vector $q_a$ of the hidden layer, the weight matrix $W_b$ between the hidden layer and the output layer, and the threshold vector $q_b$ of the output layer upon termination of the iteration;

iii. Applying the optimal initial weights $W_a$, $W_b$ and thresholds $q_a$, $q_b$ obtained by genetic algorithm to the neural network for prediction;

If $E_K$ is less than 0.1, saving the network model optimized by genetic algorithm, that is an optimal prediction model of octane number loss; if not, proceeding to step i;

(6) Employing the optimal octane loss prediction model to obtain predicted optimal operating conditions;
i. Employing random operation conditions value of the $main_1$, $main_2$, ..., $main_l$, to simulate adjustment process according to the normal range of the operation point variables, to obtain random samples, under condition of keeping variables other than the main variables unchanged; employing the optimal prediction model to the random samples;
ii. Discarding a series of qualified samples according to the product sulfur content>10 ppm;
iii. Setting the decrease of octane number loss as weight of the qualified samples, to obtain optimal conditions by weighted average of the qualified samples operation conditions value.

Employing the method of reducing octane loss in catalytic cracking of gasoline in S-Zorb plant is helpful to analyze the influencing factors of the octane loss of S-Zorb unit, obtain the optimal conditions of main operating variables, and reduce the octane loss of the unit.

The content described in the embodiments of the present specification is merely an enumeration of the implementation forms of the inventive concept, and the scope of the present invention shall not be construed as being limited to the specific forms expressed in the embodiments. Equivalent technical means that a skilled person of the art may construct from the conception of the present invention shall fall under the scope of the present invention.

We claim:

1. A method of reducing octane loss in catalytic cracking of gasoline in an S-Zorb plant, comprising the following steps:
    (a) collecting equipment data and adjusting differences thereamong to construct initial data sample set;
    (b) collating data sample set;
    (c) employing local linear embedding to reduce dimension of independent variables, and trimming the independent variables to obtain reserved independent variables;
    (d) calculating correlation coefficients of the reserved independent variables and removing variables with too high correlation coefficients to obtain main variables;
    (e) constructing a BP neural network model of the main variables to obtain optimal octane loss prediction model;
    (f) employing the optimal octane loss prediction model to obtain a predicted optimal operating condition for each main variable;
    step (a) comprises the following steps:
    i) measuring and collecting a device data in a specified time interval, the device data comprising operation point data denoted with operating point variables $a_{11}$, $a_{12}$, ..., $a_{1m}$, $a_{21}$, $a_{22}$, ..., $a_{2m}$, ..., $a_{j1}$, $a_{j2}$, ..., $a_{jm}$, raw material data denoted with raw material point variables $b_{11}$, $b_{12}$, ..., $b_{1n}$, $b_{21}$, $b_{22}$, ..., $b_{2n}$, ..., $b_{71}$, $b_{72}$, ..., $b_{7n}$, catalyst data denoted with catalyst variables $c_{11}$, $c_{12}$, ..., $c_{1n}$, $c_{21}$, $c_{22}$, ..., $c_{2n}$, ..., $c_{41}$, $c_{42}$, ..., $c_{4n}$, and product data denoted with product octane loss variables $x_1$, $x_2$, ..., $x_n$ for product octane loss data and product sulfur content variables $y_1$, $y_2$, ..., $y_n$ for product sulfur content data; m being a sample number of the operating point variables and being positive integer; n being a sample number of the raw material variables, of the catalyst variables, and of the product variables, and being positive integer; j being a number of the operating point variables being positive integers;

the operation point data comprising j of following variables: hydrogen oil ratio, pressure difference of reaction filter, pressure of reductor, flow rate of fluidized hydrogen in reductor, pressure of reactor, temperature of reactor, pressure difference of reactor, temperature of fluidized hydrogen in D-105, pressure of fluidized hydrogen in D-105, flow rate of fluidized hydrogen in D-105, pressure of back blowing hydrogen, pressure of stabilizing tower top, inlet temperature of tower top, outlet temperature of tower top, liquid level of tower top, temperature of tower top, liquid level of D-201 tower top reflux tank, temperature of dry gas out of device, temperature of gasoline out of the device, flow rate of gasoline out of the device, pressure of steam into the device, flow rate of steam into the device, flow rate to feed buffer tank, flow rate of fresh hydrogen, light hydrocarbon into the device, dry gas into the device, flow rate of dirty oil out of the device, temperature of fuel gas into the device, pressure of fuel gas into the device, flow rate of fuel gas into the device, flow rate of nitrogen into the device, pressure of nitrogen into the device, temperature of 1.0 MPa steam into the device, flow rate of circulating water into the device, flow rate of circulating water out of the device, flow rate of 0.3 MPa condensate water out of the device, flow rate of deaerated water into device, flow rate of non-purified air into the device, pressure of non-purified air into the device, pressure difference of D-107 reagent transfer line, flow rate of lifting nitrogen, and total flow of catalytic gasoline into the device; where in j>20;

the raw material data comprising sulfur content of raw material, octane number of raw materials, saturated hydrocarbon, olefin, aromatics, bromine number, and density;

the catalyst data comprising spent sorbent coke, spent sorbent sulfur, regenerated sorbent coke, and regenerated sorbent sulfur;

the product data comprising sulfur content of product, octane number loss of product;

ii) adjusting difference of collection frequency of the operation point data, raw material data, catalyst data and product data: for a sample at time k, it includes $a_{1k}$, $a_{2k}, \ldots, a_{jk}, b_{1k}, b_{2k}, \ldots, b_{7k}, c_{1k}, c_{2k}, \ldots, c_{4k}, x_1$, $x_2, \ldots, x_k, y_1, y_2, \ldots, y_k$; for m=40 n, $$a_{ik} = \frac{\sum_{x=k-40}^{k} a_{ix}}{40},$$

wherein i ranging from 1 to j, k=0, 40, 80, ..., n; constructing initial data sample set;

step (b) comprises the following steps:
i) marking bad values outside a normal range of the operation point data due to measurement error;
ii) marking bad values with large error in the operation point data: calculating arithmetic mean $$\overline{a_{ik}} = \frac{(a_{i1} + a_{i2} + \ldots + a_{im})}{m},$$

wherein i ranging from 1 to j, and residual error $v_i = a_{ik} - \overline{a_{ik}}$, wherein k ranging from 1 to m, of each type of data according to the pauta criterion, then calculating standard error $\partial$ by bessel formula $$\partial = \left(\frac{\sum_{i=1}^{j} v_i^2}{j-1}\right)^{\frac{1}{2}} = \left\{\frac{1}{j-1} \cdot \left[\sum_{i=1}^{j} a_{ik}^2 - \frac{\left(\sum_{i=1}^{j} a_{ik}\right)^2}{j}\right]\right\}^{\frac{1}{2}};$$

if residual error $v_i$ of measured value $a_{ik}$ meets requirement $|v_i|=|a_{ik}-\overline{a_{ik}}|>3\partial$, considering $a_{ik}$ as the bad value with larger error;

iii) processing the bad values in step i and step ii in the operation point data; counting average number of the bad values in each measured variable $a_i$, defining the average number as incomplete data judgment point α, if number of the bad values in a variable $a_i$ exceeds α, eliminating the variable $a_i$; if number of the bad values in a variable $a_i$ being below α, making each bad value $$a_{ik} = \frac{a_{ik-1} + a_{ik+1}}{2};$$

step (c) comprises the following steps:
i) employing local linear embedding to reduce dimension of independent variables in data sample set in step b to obtain a weight coefficient matrix; wherein the independent variables comprise the operation point variables, the raw material variables and the catalyst variables;
ii) ordering the independent variables according to an absolute value of the first column of the weight coefficient matrix from largest to smallest, and reserving the top 10% as reserved independent variables;

step (d) comprises the following steps:
i) calculating correlation coefficients $R_{iu}$ between the reserved independent variables in step c; the equation of definition of correlation coefficient is $$R_{iu} = \frac{\sum_{k=1}^{m}(a_{ik} - \overline{a_{ik}})(a_{uk} - \overline{a_{uk}})}{\sqrt{\sum_{k=1}^{m}(a_{ik} - \overline{a_{ik}})^2 \sum_{k=1}^{m}(a_{uk} - \overline{a_{uk}})^2}}$$

wherein i ranging from 1 to j, u ranging from 1 to j;
when absolute value of any $R_{iu}$ greater than 0.8, considering the correlation coefficient is too high, then calculating $$\sum_{k=1}^{j} |R_{ik}| \text{ and } \sum_{k=1}^{j} |R_{uk}|, \text{ if } \sum_{k=1}^{j} |R_{ik}| > \sum_{k=1}^{j} |R_{uk}|,$$

eliminating $a_i$; finally obtaining main variables;
ii) adding octane number of raw materials as one of the main variables to obtain:
$main_{11}$, $main_{12}$, ..., $main_{1m}$, $main_{21}$, $main_{22}$, ..., $main_{2m}$, ..., $main_{l1}$, $main_{l2}$, ..., $main_{lm}$, l being a number of the main variables and being a positive integer;

step (e) comprises the following steps:
i) building a BP neural network with the main variables $main_{11}$, $main_{12}$, ..., $main_{1m}$, $main_{21}$, $main_{22}$, ..., $main_{2m}$, ..., $main_{l1}$, $main_{l2}$, ..., $main_{lm}$ in step (d) as an input layer, with predicted product sulfur content and predicted product octane number loss as an output layer, with a hidden layer and a number of hidden layer neuron as $h=[\sqrt{l+2}+5]$;
taking 85% of the samples as training set randomly and the other 15% as testing set;

for a weight matrix $W_a$ between the input layer and the hidden layer; employing linear weighted sum to obtain $$Netin_{i_1} = \sum_{j=1}^{n} main_j W_{a_{i_1 j}}$$

of an $i_1$th neuron of the hidden layer, wherein $i_1$ ranging from 1 to h; obtaining an output of the $i_1$th neuron $$H_i = f(Netin_{i_1} - q_{a_{i_1}})$$

wherein a hidden layer threshold vector $q_a$ by a activation sigmod function $$f(x) = \frac{1}{1 + \exp(-x)};$$

for a weight matrix $W_b$ between the hidden layer and the output layer, employing linear weighted sum to obtain $$Outnetin_{i_1} = \sum_{j=1}^{n} H_j W_{b_{i_2 j}}$$

of the $i_2$th neuron of the output layer, wherein $i_2$ ranging from 1 to h; obtaining an output of the $i_2$th neuron wherein an output layer threshold vector $q_b$ by inverse function:

$$out_{i_1} = f^{-1}(Outnetin_{i_2} - q_{b_{i_2}});$$

for real output vectors $z_1$, $z_2$, obtaining a least square error of prediction result as:

$$E_K = \frac{1}{2} \sum_{i_2=1}^{2} (out_{i_2} - z_{i_2});$$

ii) employing genetic algorithm to obtain optimal parameters of the neural network: firstly, constructing each individual by means of real coding to consist of the weight matrix $W_a$ between the input layer and the hidden layer, the threshold vector $q_a$ of the hidden layer, the weight matrix $W_b$ between the hidden layer and the output layer, and the threshold vector $q_b$ of the output layer, with a population size N; initiating the N individuals with random values, and setting a current number of iterations $N_{it}=0$; then performing selection, crossover and mutation; selecting each individual by employing a roulette algorithm, with probability of each individual e being selected and passed on to a next generation as:

$$p_e = \frac{f_e}{\sum_{e=1}^{N} f_e},$$

with fitness value for $f_e$ being defined as:

$$f_e = \frac{1}{2} \sum_{e=1}^{2} (out_e - z_e);$$

employing a roulette algorithm for crossover operation, conducting selection operation by means of optionally selecting two individuals to be crossed over, and setting a crossover probability $P_c=0.8$; performing real value mutation, that is, performing bit inversion on a real code of the individual generated subsequent to the crossover operation with a mutation probability $P_m=0.008$, thereby generating a new individual; increasing the current number of iterations by one; continuing iteration of crossover operation, selection operation, and simple mutation, until one of stop conditions is reached:

first, the fitness of optimal individual $f_e$ stop rising;
second, the current number of iterations $N_{it}$ reaches a maximum iteration number $G_{max}$;
obtaining an optimal neural network with the weight matrix $W_a$ between the input layer and the hidden layer, the threshold vector $q_a$ of the hidden layer, the weight matrix $W_b$ between the hidden layer and the output layer, and the threshold vector $q_b$ of the output layer upon termination of the iteration;
iii) applying the optimal initial weights $W_a$, $W_b$ and thresholds $q_a$, $q_b$ obtained by genetic algorithm to the neural network for prediction;
if $E_K$ is less than 0.1, saving the network model optimized by genetic algorithm, that is an optimal prediction model of octane number loss; if not, proceeding to step i;
step (f) comprises the following steps:
i) employing random operation conditions value of the $main_1$., $main_2$., . . . , $main_l$. to simulate adjustment process according to the normal range of the operation point variables, to obtain random samples, under condition of keeping variables other than the main variables unchanged; employing the optimal prediction model to the random samples;
ii) discarding a series of qualified samples according to the product sulfur content >10 ppm;
iii) setting the decrease of octane number loss as weight of the qualified samples, to obtain optimal conditions by weighted average of the qualified samples operation conditions value.

* * * * *